United States Patent [19]

McEachern et al.

[11] Patent Number: 5,077,696
[45] Date of Patent: Dec. 31, 1991

[54] FLOATING SENSOR TO DETECT VERY LOW FREQUENCY PRESSURE SIGNALS

[75] Inventors: James F. McEachern, Newtown; Robert M. Balonis, Doylestown, both of Pa.

[73] Assignee: The United States of America as represented by the Secretary of the Navy, Washington, D.C.

[21] Appl. No.: 634,991

[22] Filed: Dec. 27, 1990

[51] Int. Cl.⁵ .............................................. G01S 15/00
[52] U.S. Cl. ...................................... 367/12; 367/901
[58] Field of Search ...................... 367/12, 131, 135, 3, 367/904, 901

[56] References Cited

U.S. PATENT DOCUMENTS

| | | | |
|---|---|---|---|
| 4,091,356 | 5/1978 | Hutchins | 367/12 |
| 4,222,266 | 9/1980 | Theodulou | 367/100 |
| 4,232,381 | 11/1980 | Rennick et al. | 367/135 |
| 4,310,904 | 1/1982 | Ballard et al. | 367/131 |
| 4,345,473 | 8/1982 | Berni | 367/159 |
| 4,388,711 | 6/1983 | Fay | 367/135 |

Primary Examiner—Daniel T. Pihulic
Attorney, Agent, or Firm—James V. Tura; James B. Bechtel; Susan E. Verona

[57] ABSTRACT

A floating sensor system is provided to detect very low frequency pressure signals (down to 0.01 Hz). This system detects pressure fluctuations or pressure signals of interest in the ocean or other body of water in the presence of unwanted pressure signals generated by surface wave induced motion. A drifting sensor surface float follows the surface waves and in turn moves a suspended pressure sensor vertically, such that it detects the wave motion as a change in static pressure which then constitutes a noise source. A correlation circuit and a logic circuit discriminate between a first composite signal, comprised of the pressure signals of interest and wave motion noise, and a second reference signal, comprised only of the wave motion noise to provide an output signal transmitted to a monitoring station.

17 Claims, 1 Drawing Sheet

FLOATING SENSOR TO DETECT VERY LOW FREQUENCY PRESSURE SIGNALS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to sonobuoy type, floating sensors for detecting very low frequency sounds and especially relates to oceanographic detectors for detecting pressure fluctuations caused by slow moving objects and the like in the presence of surface-wave motion.

DESCRIPTION OF THE PRIOR ART

Fay, U.S. Pat. No. 4,388,711, shows a method of canceling a flow noise received by a towed hydrophone module. Fay uses signals from a pair of hydrophones towed in tandem, inverts one of these and then adds the signals together, after appropriate phase shifting, if needed. The composite signal thereby created is thereafter added to the signal received by the towed hydrophone to cancel out the noise components attributed to water flow over the towed hydrophone and thereby yielding the signal of interest.

Rennick, et al., U.S. Pat. No. 4,232,381, shows a noise-cancellation scheme for a system which receives acoustic information. This scheme cancels out unwanted engine noise received along with an acoustic signal. An engine rotation sensor generates pulses to create an independent engine noise frequency and harmonics signal. This separate engine noise signal is subtracted from a composite input signal having information and noise combined to generate a noise free acoustic signal of interest.

Theodoulou, U.S. Pat. No. 4,222,266, shows an electronic filter for use in determining the position of a body traveling through water, (i.e. a towed hydrophone), relative to a datum, such as mean sea level. The filter is connected to an accelerometer and a pressure transducer that, respectively, produce an acceleration signal indicative of the traveling body's relative acceleration and a pressure signal indicative of the body's vertical displacement, i.e. depth in the water. The filter combines the acceleration and pressure signals to isolate a signal proportional to noise generated by the pressure transducer. A correction signal is added to the received signal. This correction signal takes into effect the changes in depth of the traveling body (towed hydrophone) and also changes in acceleration of the movement of the traveling body caused by the towing ship.

Berni, U.S. Pat. No. 4,345,473, shows an accelerometer adaptable to marine survey equipment and used in combination with submerged hydrophone signal processing to cancel the effects of a surface reflected wave. The accelerometer measures the vertical component of acceleration independent of the devices orientation or pressure. This accelerometer is used in conjunction with signal processing circuitry in towed hydrophones to compensate for erroneous signal readings attributable to pressure variations produced by ocean surface to air reflected artificially generated seismic waves.

Ballard, et al., U.S. Pat. No. 4,310,904, shows an ambient sea noise elimination system wherein the output of a directional hydrophone and an omnidirectional hydrophone are filtered and summed. The composite signal representing the effective receiving pattern below approximately 300 Hz is a vertically oriented dipole pattern having a null in the horizontal direction and the effective receiving pattern above 300 Hz is a cardiod having a null pointing vertically, either upwardly or downwardly. The composite signal is used for correcting unwanted ambient sea noise. It is applied in a summing circuit which provides compensated acoustic signals having ambient sea noise substantially removed therefrom.

Hutchins, U.S. Pat. No. 4,091,356, shows a heave compensation system for an underwater towed seismic device, which towed seismic device contains an acoustic signal source and a hydrophone receiver. An accelerometer in the towed device produces a signal indicative of the vertical acceleration of the device. This acceleration signal is double integrated to produce a position signal which is used to adjust the signal provided by the acoustic signal source. A pressure transducer in the device produces a pressure signal indicative of changes in reflected seismic signals caused by the vertical movement of the seismic sensing device and not by changes in the sensed depth of the ocean bottom.

The devices discussed above concern themselves, principally, with compensation for noise in towed systems or for noise filtering used in towed hydrophonic devices. The towed hydrophonic devices usually have active acoustic signal sources. These prior art devices focus on one of two problems. The first problem is the adding out or canceling of known repetitive noise to yield a signal of interest. The second problem is the canceling of the error of reflected seismic signals caused by a change in vertical position of a towed hydrophonic sensor. As a result, the signals which these systems are limited in dealing with are of relatively high frequency.

Non-moving acoustic sensors are capable of detecting very low frequency pressure signals and very low amplitude signals. These non-moving acoustic sensors have taken one of two forms, these being either a floating sensor or a moored, submerged sensor. However, floating sensors have to contend with relatively low frequency noise attributed by wave motion as wave motions is sinusoidal with long periods.

Previous non-moving pressure protecting systems have avoided the pressure signal errors caused by surface wave motion by mooring a sensor on the sea bottom. However, this design approach has depth restrictions and precludes open ocean sea bottom applications for battery powered radio transmitter devices.

It would be desirable to have a surface floating acoustic pressure sensor. However, with this type of device surface wave motion becomes a significant factor. The use of vertical motion isolation systems, such as those described above in connection with towed acoustic (hydrophone) devices, is impractical for noise compensation of wave movement noise because of the very large magnitude of wave motion induced pressure signals.

As an example, the cyclic, vertical, physical motion imparted to a floating acoustic sensor of one inch peak-to-peak is equivalent to a 168 dB relative to 1 micro pascal pressure signal. Typical, state-of-the-art vertical motion isolation systems can provide only approximately 26 dB of motion attenuation at 0.1 Hz signal levels. A sea state "5" condition is one where there are 12 foot waves. This wave motion would generate a noise signal of approximately seven inches of water or about 184 dB relative to one micro pascal pressure at the sensor. Thus, signals man-made, low frequency pressure would easily be masked by wave generated motion (noise) in open ocean floating sensor type devices.

It is desirable to provide a floating sensor which detects low frequency pressure signals in the open ocean and which compensates for "noise" generated wave motion.

SUMMARY OF THE INVENTION

An object of the present invention is to provide an open ocean type drifting buoy for detecting very low frequency pressure signals in the presence of unwanted pressure signals generated by surface wave induced motion.

A second object of the present invention is to provide the device with a means for sensing surface wave motion and for generating a signal proportional to the amount of surface wave motion in amplitude and sinusoidal period.

A further object of the present invention is to provide such a device with a logic circuit which discriminates between man-made signals and the previously received statistical information on wave motion generated signals of amplitude and sinusoidal period.

The objects of the present invention are realized in a surface floating, drifting-type, buoy device. A surface float portion of the device includes a battery and radio transmitter. Connected to the surface float portion is a submerged weighted lower unit portion containing a pressure sensing hydrophone and accelerometer sensitive to vertical movement, as well as signal processing electronics. The floating portion of the device and the submerged portion of the device are connected by a length of suspension cable and signal transmission lines.

The accelerometer position in the lower unit measures the change in position of that lower unit which equates to the change in position of the surface float. This device is connected to electrical processing circuitry which will provide a sinusoidal signal of amplitude and period representative of current wave motion, a reference signal.

The pressure hydrophone senses the man-made signals as well as wave noise. These sensed signals are processed in a correlation circuit device with the signals representing wave motion. The reference wave noise signal and the composite hydrophone sensed signals are compared and any lack of statistical correlation between the two provides a change in output from the correlation circuit. A logic circuit receives the output from the correlation circuit and provides an output representing wave noise or a signal reflecting the detected signal of interest. This output is transferred to the surface float portion of the device and transmitted to a monitoring station.

BRIEF DESCRIPTION OF THE DRAWINGS

The features, advantages and operation of the present invention will be better understood from a reading of the following Detailed Description of the Invention in conjunction with the following drawings in which like numerals refer to like elements and in which.

DETAILED DESCRIPTION OF THE PREFERRED EMBODIMENT

Figure 1:
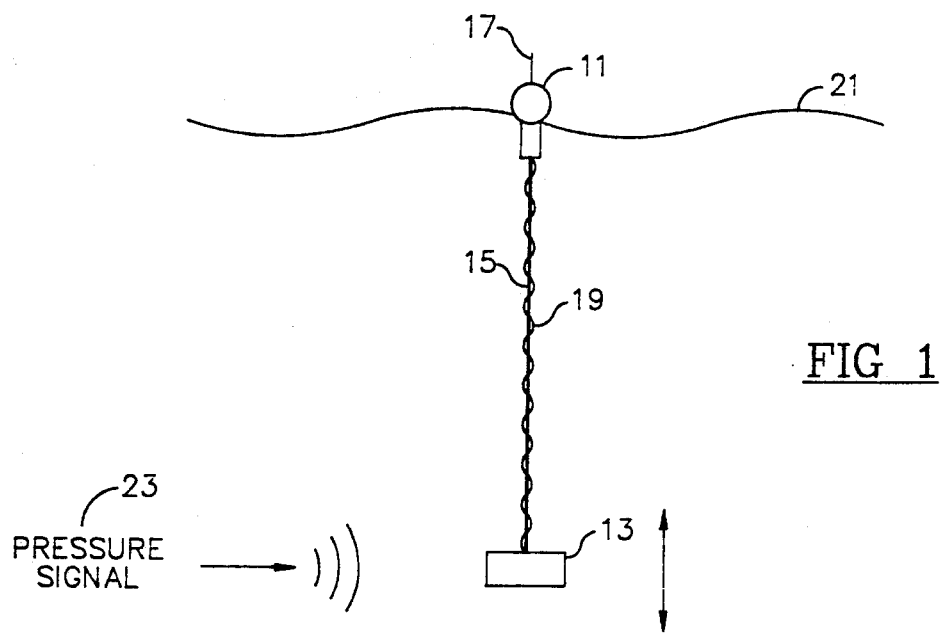
FIG. 1 shows a block diagram of the major components of the floating sensor device in an open ocean deployment.

A floating sensor to detect very low frequency pressure signals in the presence of open ocean wave noise includes a floating portion 11, FIG. 1, and a submerged portion 13 held at a desired depth by a length of suspension cable 15. Contained within the floating portion 11 is a battery and a radio transmitter which will be discussed further below. Connected to the radio transmitter and projecting above the floating portion 11 is a radio antenna 17, FIG. 1. An electrical signal and power transmission cable 19 connects the electrical components in the floating portion 11 and the submerged portion 13.

The floating portion or buoy 11 is carried by the wave action of the ocean surface 21. These ocean waves 21 have a sinusoidal form which causes the buoy 11 to rise and fall with the wave motion. This wave 21 motion causes pressure differences, by changing pressure head, at the submerged portion 13 hydrophone. This changing pressure at a submerged portion 13 hydrophone. This changing pressure at a submerged point caused by surface waves constitutes unwanted noise of sufficient magnitude to mask a man-made pressure signal 23 which is received by a hydrophone located in the submerged portion 13.

Figure 2:
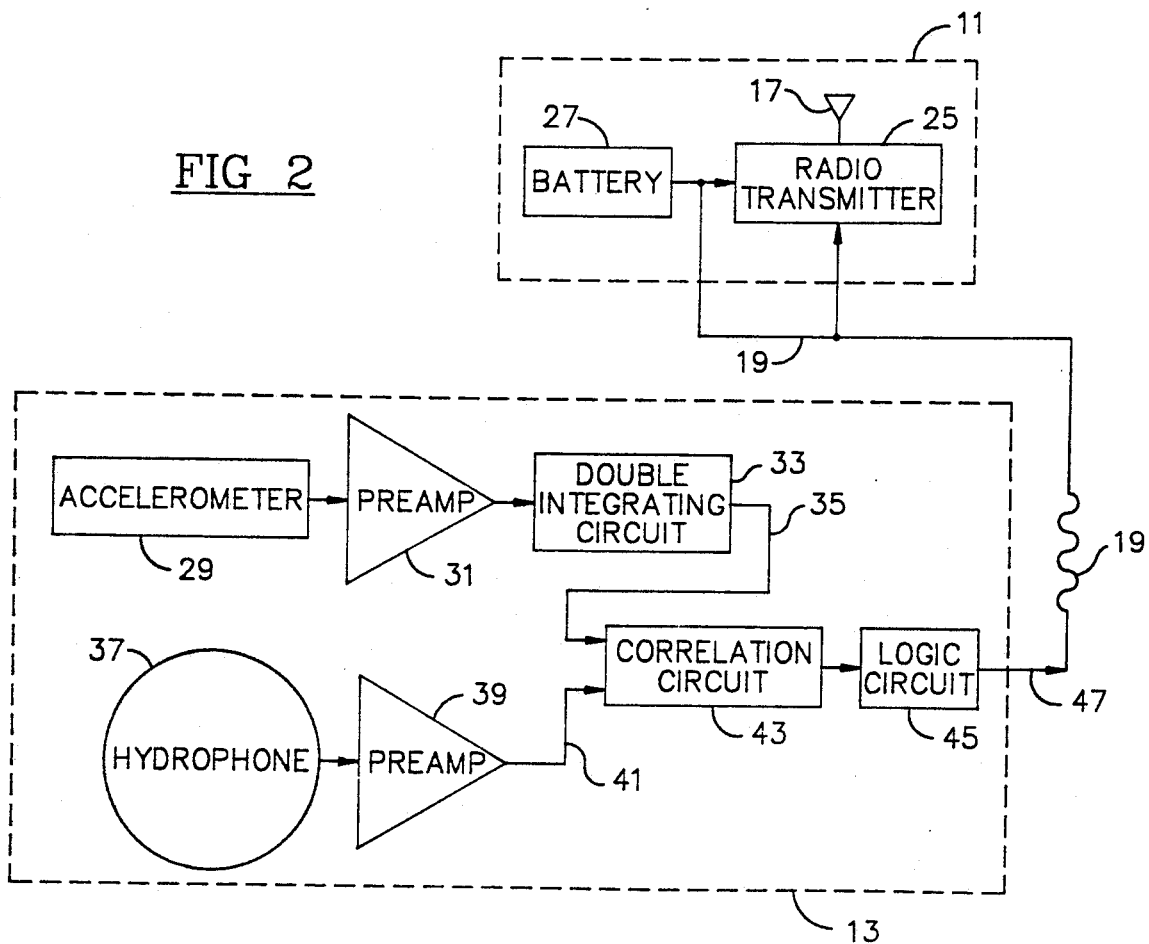
FIG. 2 is a block diagram of the electronic signal processing components positioned in the floating sensor device of FIG. 1.

The components housed in the floating portion 11 are shown in FIG. 2. The antenna 17 is connected directly to a radio transmitter circuit 25. This ratio transmitter 25 may be selected to transmit in the AM or FM bands and may carry pulse modulated or frequency modulated information. The radio transmitter 25 as well as the electrical components in the submerged portion 13 are powered from a battery 27 housed in the floating buoy 11. Again, the battery 27 can be any of those available in the marketplace, including the longer life lithium batteries or cadmium batteries. As an alternative, a solar charger may be included with the battery 27.

As recited above, an electrical signal and power transmission cable 19 electrically connects the floating buoy 11 with the suspended, submerged portion 13. This submerged portion 13, of course, is weighted, to compensate for any buoyancy it may have, in order that it may be submerged to the full length of the suspension cable 15.

Positioned within the submerged housing 13 is an accelerometer 29. This accelerometer can assume the design considerations of some of the prior art devices described herein above. Accelerometer 29 provides an electrical signal output as a function of vertical acceleration, both with upward and downward movement.

The output from the accelerometer 29 is amplified through a preamplifier circuit 31 and then connected into a double integration circuit 33. The electrical output from the double integration circuit 33 is an electrical signal which is equivalent to the instantaneous position of the submerged housing portion 13, as well as that of the floating buoy 11, as these two portions 11, 13 are connected by the suspension cable 15.

The signal 35 represents the wave motion noise created by changes in pressure at the location of the submerged housing portion 13 and the hydrophone device housed therein. A hydrophone, or acoustic pressure sensing device 37 senses the wave 21 motion noise as well as the presence of a pressure signal of interest, signal 23 of FIG. 1. An electrical signal output from hydrophone 37 is sent through a preamplifier circuit 39. The output from the preamplifier circuit 39 is an amplified signal 41 representing the composite of the desired pressure signal 23 and the wave 21 motion noise. This composite signal 41 as well as the wave motion noise signal 35 provided out of the double integration circuit 33 are entered into a correlation circuit 43.

Correlation circuit 43 is of a design previously found in information processing circuits for determining the statistical correlation between any two electrical signals.

The output of the correlation circuit 43 is connected into a logic circuit 45. Logic circuit 45 discriminates upon the correlation information received from the correlation circuit 43. The signal provided by the correlation circuit 43 to the logic circuit 45 indicates the correlation "value" of the composite signal 41 to the wave noise signal 35, i.e. whether the composite signal 41 deviates from the wave noise signal 35 and by what value.

Logic circuit 45 provides an output signal 47 to the radio transmitter 25 via the electrical cable 19 for transmission to a monitoring station. The output signal 47 from logic circuit 45, therefore, either represents a sine modulated tone indicative of only wave 21 motion noise or a signal on the modulated tone which represents that portion of the composite signal 41 which does not statistically correlate, within the design statistical values, to the wave noise signal 35, i.e. the signal 23.

The goal of the system is to detect man-made, low frequency pressure signals and to discriminate wave motion noise received by the hydrophone 37 housed within the submerged housing portion 13 at the end of the suspension cable 15. The suspension cable can be of any length, and as an example, a length of 100 feet is of particular interest. As the waves 21 move the surface float 11 vertically, the lower unit 13 is driven in the same vertical motion by the surface float via the suspension cable 15. The resulting vertical accelerations are sensed by the accelerometer 29. At the same time, the pressure hydrophone 37 senses the change in static pressure due to the vertical displacement of the device and in the absence of any other pressure signals, processes an output analogous to the vertical displacement. Thus, the output of the double integrated accelerometer leg of the circuitry, i.e. signal 35, and the output of the hydrophone leg of the circuitry, i.e. signal 41, are the same if the only input to the hydrophone 29 is surface wave motion "noise". When these two signals 35 and 41 are input into the correlation circuit 43, the output will equal 1, or perfect correlation. The logic circuit 45 would then send an appropriate signal to be transmitted by the radio transmitter 25 indicating the absence of any pressure signals 23, and a signal level due to surface waves 21.

If a pressure signal 23, unrelated to the wave 21 induced vertical motion, is present, it will be detected only by the pressure hydrophone 37. The signal 35 from the accelerometer leg and the signal 41 from the hydrophone leg will then be uncorrelated and the logic circuit 45 will provide a signal 47 indicating a correlation less than 1, i.e. a non-surface wave related pressure signal present. Output signal 47 will have fluctuations which will increase as the correlation value between signals 35 and 41 decreases. The logic circuit output signal 47 can appear as a modulation representing the pressure signal 23 riding on a carrier frequency, with the carrier frequency signal representing the wave 21 motion noise.

The advantage of this type of buoy system over earlier designs is that it eliminates the need for expensive and complicated vertical isolation suspension systems. This allows the present invention to operate in frequency ranges where vertical isolation is not feasible. In addition, the present invention transmits a signal indicating the presence or absence of the pressure signal 23, as a result of a simple, single correlation process carried out by the electronics. The signal transmitted by the antenna 17 is either pure carrier wave signal (the wave 21 noise), or a modulated carrier wave signal with the modulation representing the signal 23. The present invention, therefore, is implemented in simple and inexpensive circuitry.

Changes can be made in the above-described invention without departing from the intent and scope thereof. As an example, the location of the accelerometer and the correlation circuit can be changed to the surface float unit in lieu of the submerged lower unit. While the lower location is preferred, since a more accurate measurement of hydrophone motion is determined at that location, reallocation of electronics is still within the scope of the invention. Likewise, other types of modifications can be made. It is intended, therefore, that the above-description be read as illustrative of the invention and not be interpreted in the limiting sense.

What we claim is:

1. A floating acoustic sensor to detect in-water low frequency pressure signals in the presence of wave motion pressure noise, comprising:
   a floating body for floating on the surface of said water and for rising and falling with said wave motion;
   a hydrophonic-type pressure sensing circuit connected to said floating body for being submerged under the surface of said water, for rising and falling with said floating body, and providing an electric signal indicative of instantaneous acoustic pressure sensed;
   a change of position detector circuit for sensing the change in vertical position of said floating body and said hydrophonic-type pressure sensing circuit and providing an electric signal indicative instantaneous position sensed; and
   a discriminating circuit connected to said hydrophonic-type pressure sensing circuit output and to said change of position detector circuit output, said discriminating circuit providing an output signal with two distinct and separate components, the first component representing wave motion pressure noise and the second component representing low frequency pressure signals.

2. The sensor of claim 1 wherein said discriminating circuit includes a correlation circuit connected to said hydrophonic-type pressure sensing circuit output and to said change of position detector circuit output, said correlation circuit providing an output signal representing the mathematical correlation value between the instantaneous values of said hydrophonic-type pressure sensing circuit output and said change of position detector circuit output; and
   a logic circuit connected to the output of said correlation circuit, said logic circuit providing said first signal output component when the output from said correlation circuit indicates a correlation of "1" and providing said second signal output component when the correlation is less than "1".

3. The sensor of claim 2 wherein said logic circuit provides a second signal output component that varies in direct relation to the correlation value determined by said correlation circuit.

4. The sensor of claim 3 also including a radio transmitter circuit connected to the output of said logic circuit for transmitting said logic circuit provided first and second signal output components.

5. The sensor of claim 4 wherein said radio transmitter is located in said floating body.

6. The sensor of claim 5 also including:
a submergible housing holding said hydrophonic-type pressure sensing circuit;
a mechanical link connecting said floating body to said submergible housing; and
an electrical cable electrically connecting said floating body to said submergible housing.

7. The sensor of claim 6 wherein said mechanical connecting link is a suspension cable connected between said floating body and said submergible housing, and wherein said submergible housing has a negative buoyancy.

8. The sensor of claim 7 wherein said hydrophonic-type pressure sensing circuit includes a hydrophone circuit positioned in said submergible housing and a first preamplifier circuit connected to the output of said hydrophone circuit, said preamplifier circuit being positioned within said submergible housing and the output of said first preamplifier circuit being connected to said correlation circuit.

9. The sensor of claim 8 wherein said change of position detector circuit includes:
an accelerometer circuit positioned in said submergible housing;
a second amplifier circuit positioned in said submergible housing and connected to the output of said accelerometer circuit; and
a double integrator circuit positioned in said submergible housing and connected to the output of said second preamplifier circuit, the output of said double integrator circuit being connected into said correlation circuit.

10. The sensor of claim 9 wherein said correlation circuit and said logic circuit are positioned in said submergible housing, and wherein said logic circuit output is connected to said radio transmitter with said electrical cable.

11. A floating, open ocean, acoustic sensor with discrimination of wave motion noise, comprising:
a surface float member;
a submergible member positionable at a predetermined depth under the surface of the sea;
a mechanical linkage connecting said submergible member to said surface float member so that both members rise and fall together with sea wave motion;
a hydrophone circuit, positioned in said submergible member for sensing low frequency pressure signals and sea wave motion noise and providing a first output signal composite of said signals and said noise;
a motion detector circuit for producing a second output signal responsive to said sea wave motion and indicative of sea wave motion noise; and
a determination circuit connected to the output of said hydrophone circuit and to the output of said motion detector circuit for correlating the difference between said first composite signal and said second sea wave motion noise signal, said determination circuit providing a first resultant output signal in the presence of a "1" correlation determination and a second resultant output signal in the presence of a less than "1" correlation determination.

12. The sensor of claim 11 wherein said determination circuit provides a second resultant output signal that varies in relation to the correlation value determination variance from a "1" correlation.

13. The sensor of claim 12 also including a relay device positioned in said surface float member and electrically connected to said determination circuit output, said relay device being capable of transmitting the resultant output signals received from said determination circuit.

14. The sensor of claim 13 wherein said motion detector circuit is positioned in said submergible member and detects the instantaneous vertical rise and fall of said surface float member and said submergible member whereby it provides said second sea wave motion noise signal responsive thereto.

15. The sensor of claim 14 wherein said determination circuit includes a correlation circuit connected on its inputs to both said first composite signal from said hydrophone circuit and said second sea wave motion noise signal from said motion detector circuit, and a logic circuit connected to the output of said correlation circuit, with the output of said logic circuit being connected to said relay device.

16. The sensor of claim 15 wherein said motion detector circuit includes an accelerometer circuit and a double integration circuit connected on its input to the output of said accelerometer circuit, with the output of said double integration circuit being connected to an input of said correlation circuit.

17. The sensor of claim 16 wherein said correlation circuit is a single correlation performance circuit.

* * * * *